United States Patent [19]

Weatherup

[11] Patent Number: 4,879,490

[45] Date of Patent: Nov. 7, 1989

[54] GAS DISCHARGE DEVICES WHEREIN ELECTRONS ARE INJECTED INTO A HIGH FIELD REGION

[75] Inventor: Clifford R. Weatherup, Chelmsford, United Kingdom

[73] Assignee: English Electric Valve Company Limited, Chelmsford, United Kingdom

[21] Appl. No.: 87,923

[22] Filed: Aug. 21, 1987

[30] Foreign Application Priority Data

Aug. 30, 1986 [GB] United Kingdom ............... 8621022
Jul. 29, 1987 [GB] United Kingdom ............... 8718005

[51] Int. Cl.⁴ .............................................. H01J 17/46
[52] U.S. Cl. .................................. 313/601; 313/632; 313/306; 313/310
[58] Field of Search .............. 313/574, 595, 597, 599, 313/602, 601, 631, 632, 306, 310

[56] References Cited

FOREIGN PATENT DOCUMENTS

| 824762 | 12/1959 | United Kingdom . |
| 1583493 | 1/1981 | United Kingdom . |
| 2065962 | 7/1981 | United Kingdom . |
| 2125613 | 3/1984 | United Kingdom . |
| 2153140A | 8/1985 | United Kingdom . |
| 2169131 | 7/1986 | United Kingdom . |
| 2170949 | 8/1986 | United Kingdom . |

*Primary Examiner*—Kenneth Wieder
*Attorney, Agent, or Firm*—Spencer & Frank

[57] ABSTRACT

A gas discharge device includes means for injecting electrons into a high field region between an anode and a cathode structure located within a gas filled envelope. This causes ionisation within the region and triggers the device into conduction.

18 Claims, 2 Drawing Sheets

1

GAS DISCHARGE DEVICES WHEREIN ELECTRONS ARE INJECTED INTO A HIGH FIELD REGION

BACKGROUND OF THE INVENTION

This invention relates to gas discharge devices.

Gas discharge devices are typically used as closing switches in pulse power systems and generally comprise an anode and a cathode in a gas filled envelope. The device must be constructed so as to withstand a high potential difference until triggered into conduction.

SUMMARY OF THE INVENTION

The present invention seeks to provide a gas discharge closing switch triggered by an electron beam.

According to the invention there is provided a gas discharge device comprising, within a gas filled envelope, an anode and a cathode and means for injecting electrons into a high field region between them whereby a discharge is initiated within the device. As the electrons are injected into the high field region, they are accelerated and a relatively high degree of ionisation is achieved through collision processes. This enables rapid turn-on of the device to be achieved and tends to produce a uniform discharge across the device. The cathode may comprise a volume of ionised gas substantially contained within a metallic enclosure, the required ionisation being produced during operation of the device. Where such a "hollow cathode box" is employed, preferably the electrons injected into the high field region are arranged to pass through the volume which is substantially contained within the enclosure. In another embodiment of the invention, the electrons are injected directly into the high field region, that is, they are not required to pass through intervening apertures in a cathode structure.

Advantageously, injected electrons are arranged to be incident on a surface such that they are reflected into the high field region.

Preferably the electrons are produced by an electron beam-forming device comprising a beam cathode member having a hole in the surface thereof and an anode member, being arranged such that, when a sufficiently high potential difference is applied between them, a collimated beam of electrons is formed extensive of the hole. Such an arrangement enables high energy electrons to be produced and, since they are well collimated, the path travelled by the injected electrons may be accurately controlled. The cathode of the device may be arranged to act as the anode member, and the hole may be circular, or be a slot, such as for example an annular channel.

BRIEF DESCRIPTION OF THE DRAWINGS

Some ways in which the invention may be performed are now described by way of example with reference to the accompanying drawings in which.

DESCRIPTION OF THE PREFERRED EMBODIMENTS

Figure 1:
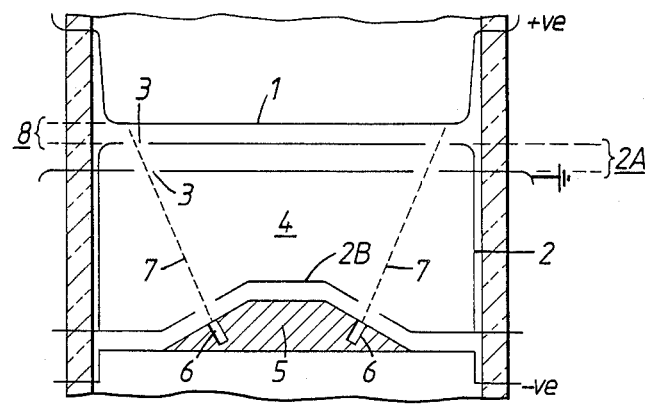
FIGS. 1, 2, 3 and 4 schematically illustrate respective gas discharge switches in accordance with the invention.

With reference to FIG. 1, a gas discharge switch includes an anode 1 and a cathode structure 2, the electrode assembly being contained within a ceramic envelope which also contains hydrogen at 1 torr pressure. The cathode structure 2 is generally cylindrical in configuration, having an upper part 2A, which is a double layer portion having apertures 3 therein, and a lower part 2B. The cathode structure 2 substantially encloses a volume 4 which comprises the cathode of the switch when it contains ionised gas during operation of the device. The apertures 3 in one layer of part 2A are offset from those in the other. The switch also includes a beam cathode member 5 within which are located a plurality of holes 6. The holes 6 are located in faces of the cathode member 5 which are inclined with respect to the surfaces of the upper part 2A of the cathode and the anode 1. The holes 6 are drilled normal to the surfaces of the beam cathode member 5 in which they are located and are aligned with the aperture 3 in the cathode structure 2 to point in a direction towards the anode 1. The lower part 2B of the cathode structure 2 which constitutes an anode member is located close to, but spaced apart from, the beam cathode member 5, conforming to its surface configuration.

During operation of the gas discharge switch, a positive voltage is applied to the anode 1 and the cathode structure 2 is maintained at ground potential. When it is wished to initiate conduction, a voltage of −10 kV is applied to the beam cathode member 5. This causes collimated electron beams to be formed extensive of each of the holes 6 in directions indicated by the broken lines 7. The electron beams are arranged to pass through apertures in the part 2B, through the apertures 3 in the part 2A and into the high field region 8 between the anode 1 and the cathode structure 2, causing ionisation to be produced. Positive ions are attracted towards the cathode structure 2 causing secondary emission of electrons from its surfaces and the volume 4 becomes filled with plasma and the walls defining the volume together.

Figure 2:
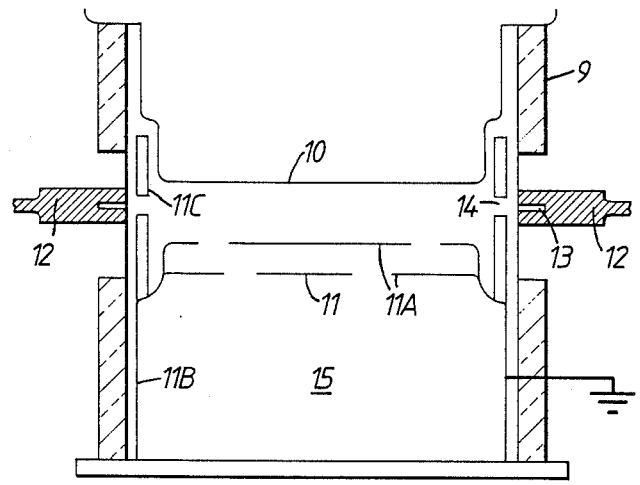

With reference to FIG. 2, in another gas discharge switch in accordance with the invention, a helium filled envelope 9 contains an anode 10 and a cathode structure 11, the cathode structure comprising a double layer part 11A and a cylindrical part 11B and an upper cylindrical portion 11C which is an extension of part 11B. A plurality of beam cathode members 12 are located around the circumference of the switch and have holes 13 in their front surfaces, which are located in the volume between the anode 10 and cathode structure 11. The upper cylindrical portion 11C is located coaxially within the envelope 9 in front of the beam cathode members 12 and has apertures 14 therein which are in register with the holes 13. During operation of the switch, a high field region exists between the anode 10 and cathode structure 11, the latter being at ground potential. When it is wished to establish a discharge within the switch a negative potential is applied to the beam cathode members 12 such that a potential difference of approximately 10 kV exists between them and the cathode structure 11. A collimated electron beam is produced extensive of each hole 13 and is injected into the high field region. This causes ionisation within that region and a plasma is produced within a volume 15 defined by the cathode structure 11. The ionisation so produced and the enclosure together act as a cathode, and conduction occurs between it and the anode 10.

Figure 3:
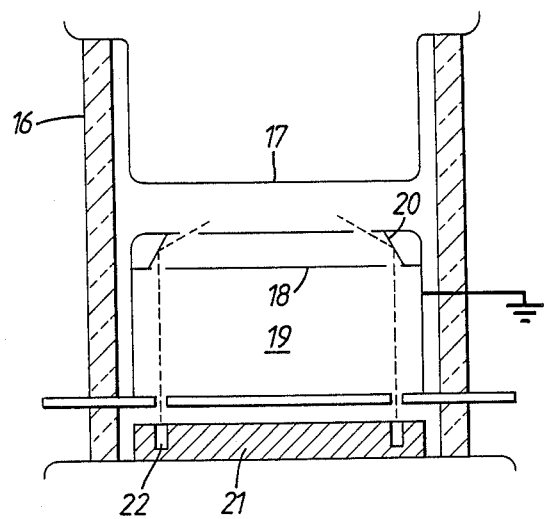

With reference to FIG. 3, a gas discharge switch has an envelope 16 within which is contained hydrogen at about 1 torr pressure. An anode 17 is contained within the envelope 16 together with a cathode structure 18 which is cylindrical and substantially encloses a volume 19. The cathode structure 18 includes a double layer part having offset apertures and an angled portion 20 connecting the two layers. A beam cathode member 21 is also included within the envelope 16 and has an annular slot 22 in its front surface, that is in the surface directed towards the anode 17.

When it is wished to trigger a discharge within the switch, the beam cathode member 21 is made negative with respect to the cathode structure 18 causing an annular collimated electron beam to be produced from the slot. The electrons are directed towards the anode 17 through the apertures in the cathode structure 18 where they are incident on the inclined part 20, their path being shown by broken lines. They are reflected from the inclined surface 20 into the high field region between the anode 17 and the cathode structure 18. Collision of the electrons with the inclined surface 20 may also cause secondary electrons to be emitted, producing additional ionisation and enabling ionisation to be achieved rapidly within the volume 19. The inclined portions 20 may be made of material which has good secondary emission characteristics to enable a large number of relatively high energy electrons to be produced.

Figure 4:
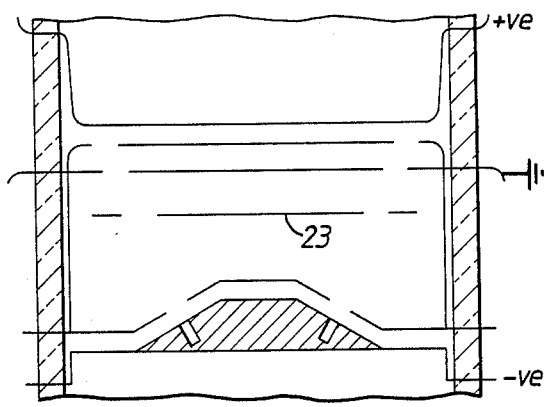

With reference to FIG. 4, another gas discharge device is similar to that illustrated in FIG. 1, but also includes a grid 23 located in the enclosed volume. This enables modification of the triggering characteristics and/or recovery characteristics of the switch if desired.

I claim:

1. A gas discharge device comprising, within a gas-filled envelope, an anode, a cathode and means for injecting electrons into a high field region, having no electrodes therein, between said anode and said cathode for initiating a discharge within said high field region, said device acting as a switch for allowing conduction through said device when triggered by said electrons entering said high field region.

2. A device as claimed in claim 1 wherein said electrons are directly injected into said high field region.

3. A device as claimed in claim 1 wherein said cathode comprises a metallic enclosure and a volume of ionised gas substantially contained within said enclosure, said
ionised gas being produced during operation of the device.

4. A device as claimed in claim 3 wherein said electrons injected into said high field region pass through said volume of ionised gas.

5. A device as claimed in claim 1 wherein injected electrons are incident on a surface prior to entering said high field region.

6. A device as claimed in claim 1 wherein the electrons injected into said high field region are produced by an electron beam forming device comprising a beam cathode member having a hole in a surface thereof and an anode member spaced from said beam cathode member, a collimated beam of electrons being formed extensive of said hole when a sufficiently high potential difference is applied between said beam cathode and anode members.

7. A device as claimed in claim 6 wherein said anode member is part of said cathode.

8. A device as claimed in claim 1 which further includes a control grid.

9. A device as claimed in claim 8 wherein said cathode comprises a metallic enclosure including a grid and a volume of ionised gas substantially contained within said metallic enclosure, said ionised gas being produced during operation of the device.

10. A gas discharge device comprising:
a gas-filled envelope having a longitudinal axis;
an anode positioned within said envelope coaxial with said axis;
a cathode structure positioned within said envelope coaxial with said axis and spaced from said anode, said cathode structure including first and second spaced parts each having at least one aperture therein, the first and second parts of said cathode structure defining a volume for enclosing ionised gas during operation of said device;
means for applying a high electric field in the region between said anode and said cathode structure, said region having no electrodes therein;
a beam cathode member positioned adjacent said cathode structure; and
means for applying a conduction initiating voltage between said beam cathode member and said cathode structure, application of said conduction initiating voltage causing a collimated electron beam to be emitted from said beam cathode member and pass through an aperture in said cathode structure into the high electric field region between said anode and cathode structure causing ionisation to be produced in said region, whereby ions are attracted towards said cathode structure causing said ionised gas to be formed within said volume.

11. A gas discharge device as claimed in claim 10, wherein the electron beam emitted by said beam cathode member passes through an aperture in the second part of said cathode structure before entering said high field region between said anode and cathode structure.

12. A gas discharge device as claimed in claim 11, wherein said electron beam enters said high field region at an angle which is substantially perpendicular to said longitudinal axis.

13. A gas discharge device as claimed in claim 10, wherein said beam cathode member is positioned within said envelope adjacent the side of the second part of said cathode structure remote from the first part of said structure, and wherein said electron beam emitted by said beam cathode member passes through apertures in the first and second parts of said cathode structure before entering said high field region between said anode and cathode structure.

14. A gas discharge device as claimed in claim 13, wherein said electron beam enters said high field region at an acute angle with respect to said longitudinal axis.

15. A gas discharge device as claimed in claim 10, which further includes a grid electrode located within the volume defined by said cathode structure.

16. A gas discharge device as claimed in claim 10, wherein the first part of said cathode structure comprises first and second spaced layers, said first and second spaced layers having apertures therein which are spaced at different distances from said longitudinal axis, said gas discharge device being further provided with an angled member connecting said first and second layers, said angled member emitting secondary electrons when said electron beam impinges thereon.

17. A gas discharge device as claimed in claim 15, wherein said grid electrode has at least one aperture and said aperture is in register with an aperture of said cathode structure.

18. A gas discharge device as claimed in claim 10, wherein said first and second parts are cylindrical.

* * * * *